UNITED STATES PATENT OFFICE.

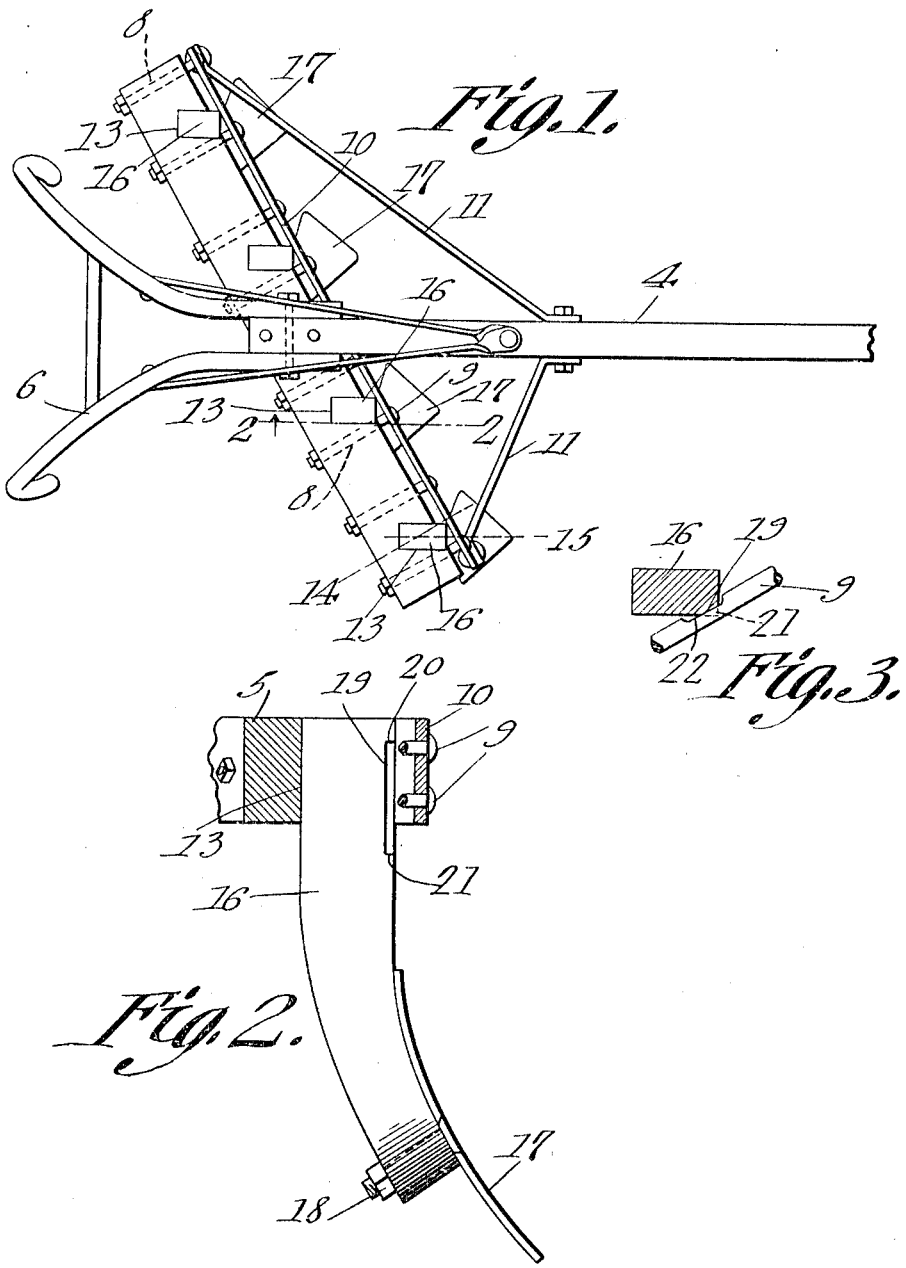

WILLIAM J. TISDALE, OF MOSELLE, MISSISSIPPI.

CULTIVATOR.

1,118,882.  Specification of Letters Patent.  Patented Nov. 24, 1914.

Application filed April 29, 1914. Serial No. 835,279.

*To all whom it may concern:*

Be it known that I, WILLIAM J. TISDALE, a citizen of the United States, residing at Moselle, in the county of Jones and State of Mississippi, have invented a new and useful Cultivator, of which the following is a specification.

This invention relates to improvements in cultivators.

The object of the present invention is to provide a cultivator with improved means for securing the standards to the cultivator bar.

A further object of the invention is to provide a standard so arranged as to prevent its accidental displacement from the cultivator bar during the time it is being adjusted with relation thereto.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which—

Figure 1 is a plan view of the improved cultivator. Fig. 2 is an enlarged sectional detail of one of the standards, taken on the line 2—2 of Fig. 1. Fig. 3 is an enlarged sectional view on the line 3—3 of Fig. 1.

Referring to the drawings in which similar reference numerals designate corresponding parts throughout the several views, the cultivator includes a tongue 4 to which the oblique or angularly disposed cultivator bar 5 is secured. The cultivator bar 5 is provided with a plurality of apertures 8 extending transversely therethrough, which receive the bolts 9 therein. The clamping plate 10 is carried to the front of the cultivator bar by the bolts 9 as clearly illustrated in Fig. 1. The bar 5 is provided in its front side with rectangular notches 13 arranged obliquely or angularly relative to the longitudinal axis of the bar 5. The notches 13 are arranged at an angle relative to a line 14 perpendicular to the clamping bar 10, and the notches 13 are arranged in longitudinal lines 15 parallel with the beam 5. The rectangular notches 13 receive the standards 16 therein which are of similar cross sectional contour and which are rigidly held within said notches by contacting at their projecting corners with the clamping plate 10. The standards 16 have the usual blades 17 secured to their lower ends by the bolts 18. The standards are each provided with the beveled corner 19 which is of limited length, thus defining upper and lower shoulders 20 and 21. The bolts 9 are provided with recesses 22 engaging the beveled portions 19, whereby when the clamping plate is slightly loosened for the adjustment of the standard, the standards are free to move until stopped by the shoulders 20 and 21. Thus the annoyance of having the standards become accidentally detached from the cultivator bar is obviated.

The relative disposition of the notches 13, and the tongue 4 provides that the force incident to the points engaging the ground will be in a line with the longitudinal axis of the standards considered in a transverse plane which is able to withstand the greatest force in this direction. Furthermore the clamping plate contacts with the corners of the standards and thus provides a secure locking action for the standards, forcing the rear corner and one side into engagement with the corresponding portions of the rectangular notches of the cultivator bar. In this manner a rigid and efficacious locking action will be had between the standards and the cultivator bar, preventing the accidental movements thereof. The leveling of the corners of the standards does not materially weaken the same and prevents the standards from becoming accidentally detached from the cultivator bar during their adjustment. Suitable braces 11 extend between the tongue and extremities of the cultivator bar to rigidly hold the same in proper angular position.

Having thus fully described my invention, what I claim is:—

1. A cultivator bar having oblique rectangular notches in one side, standards of rectangular cross section seated within the said notches and having certain corners projecting from the bar, and a clamping plate secured to the said side of the bar and engaging the projecting corners of the standards.

2. A cultivator bar having notches in one side, standards seated in the said notches, a clamping plate contacting with the standards, and securing members engaged through the plate and bar, the standards having portions engaging the securing members and provided with terminal shoulders for limiting the movement of the standards when the clamping plate is loosened.

3. A cultivator bar having oblique rectangular notches in one side, standards of rectangular cross section seated in the notches and having certain corners projecting from the bar, a clamping plate contacting with the said projecting corners of the standards, and securing members engaged through the plate and bar, other corners of the standards having portions slidably engaging the said securing members and provided with terminal shoulders for limiting the movement of the standards when the clamping plate is loosened.

In testimony that I claim the foregoing as my own, I have hereto affixed my signature in the presence of two witnesses.

WILLIAM J. TISDALE.

Witnesses:
CHAS. D. WEBB,
ALEXANDER E. GRAYSON.

Copies of this patent may be obtained for five cents each, by addressing the "Commissioner of Patents, Washington, D. C."